United States Patent
Boyes et al.

(10) Patent No.: US 8,964,858 B2
(45) Date of Patent: *Feb. 24, 2015

(54) SYSTEMS AND METHODS FOR VISUALIZING ERRORS IN VIDEO SIGNALS

(75) Inventors: David John Boyes, Roanoke, VA (US); John Garfield Williams, Roanoke, VA (US)

(73) Assignee: JDS Uniphase Corporation, Milpitas, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/456,002

(22) Filed: Apr. 25, 2012

(65) Prior Publication Data

US 2012/0206611 A1 Aug. 16, 2012

Related U.S. Application Data

(63) Continuation of application No. 11/366,615, filed on Mar. 3, 2006, now Pat. No. 8,189,686.

(51) Int. Cl.
*H04N 7/12* (2006.01)
*H04L 1/20* (2006.01)
*H04L 1/00* (2006.01)

(52) U.S. Cl.
CPC ................ *H04L 1/20* (2013.01); *H04L 1/0045* (2013.01)
USPC .................................................. 375/240.27

(58) Field of Classification Search
CPC ............................... H04L 1/20; H04L 1/0045
USPC .......... 375/240.27, 240.01, 240.26, 224, 228; 714/704, 795, 746, 716
See application file for complete search history.

(56) References Cited

U.S. PATENT DOCUMENTS

| | | | | |
|---|---|---|---|---|
| 6,088,470 A * | 7/2000 | Camus et al. | ................. | 382/117 |
| 6,278,728 B1 * | 8/2001 | McHale et al. | ................ | 375/219 |
| 6,285,410 B1 * | 9/2001 | Marni | ........................... | 348/576 |
| 6,366,644 B1 * | 4/2002 | Sisk et al. | .................... | 379/1.04 |
| 6,516,053 B1 * | 2/2003 | Ryan et al. | ....................... | 379/21 |
| 6,701,269 B1 * | 3/2004 | Jungerman et al. | ........... | 702/106 |
| 6,865,700 B1 * | 3/2005 | Malhotra et al. | .............. | 714/704 |
| 7,457,461 B2 * | 11/2008 | Gilgen | ......................... | 382/166 |
| 7,702,994 B2 * | 4/2010 | Ramanzin | .................... | 714/807 |
| 2002/0109787 A1 * | 8/2002 | Moni et al. | ..................... | 348/616 |
| 2002/0190999 A1 * | 12/2002 | Lee | ................................. | 345/606 |
| 2003/0053142 A1 * | 3/2003 | Wengender | ................... | 358/437 |
| 2004/0061785 A1 * | 4/2004 | Aufrichtig et al. | ........ | 348/207.99 |
| 2004/0123191 A1 * | 6/2004 | Salant et al. | .................. | 714/704 |
| 2004/0128317 A1 * | 7/2004 | Sull et al. | .................... | 707/104.1 |
| 2005/0254584 A1 * | 11/2005 | Kim et al. | ................ | 375/240.27 |
| 2006/0013318 A1 * | 1/2006 | Webb et al. | .............. | 375/240.25 |
| 2006/0015814 A1 * | 1/2006 | Rappaport et al. | ............ | 715/733 |
| 2006/0156161 A1 * | 7/2006 | Warner et al. | ................. | 714/746 |
| 2006/0200708 A1 * | 9/2006 | Gentieu et al. | ................ | 714/704 |
| 2007/0156360 A1 * | 7/2007 | Romero | .......................... | 702/69 |
| 2007/0160133 A1 * | 7/2007 | Bao et al. | ................... | 375/240.1 |
| 2007/0189175 A1 * | 8/2007 | Vedanabhatla et al. | ....... | 370/241 |

* cited by examiner

*Primary Examiner* — Shuwang Liu
*Assistant Examiner* — Helene Tayong
(74) *Attorney, Agent, or Firm* — JDS Uniphase Corporation

(57) ABSTRACT

Systems and methods for analyzing the performance of a digital network include capturing a stream of digital data, e.g., interne protocol (IP) packets, that represent streaming video, identifying which of the IP packets include bit errors, determining to which of a plurality of pixels the IP packets including bit errors belong and identifying such pixels as corrupted pixels, and illuminating only the corrupted pixels on a display of a tool. Corrupted pixels in different time blocks can be displayed with different colors to gain a better appreciation of the bit error rate over time.

16 Claims, 6 Drawing Sheets

FIG. 2  BER=.1%
FIG. 3  BER=.3%

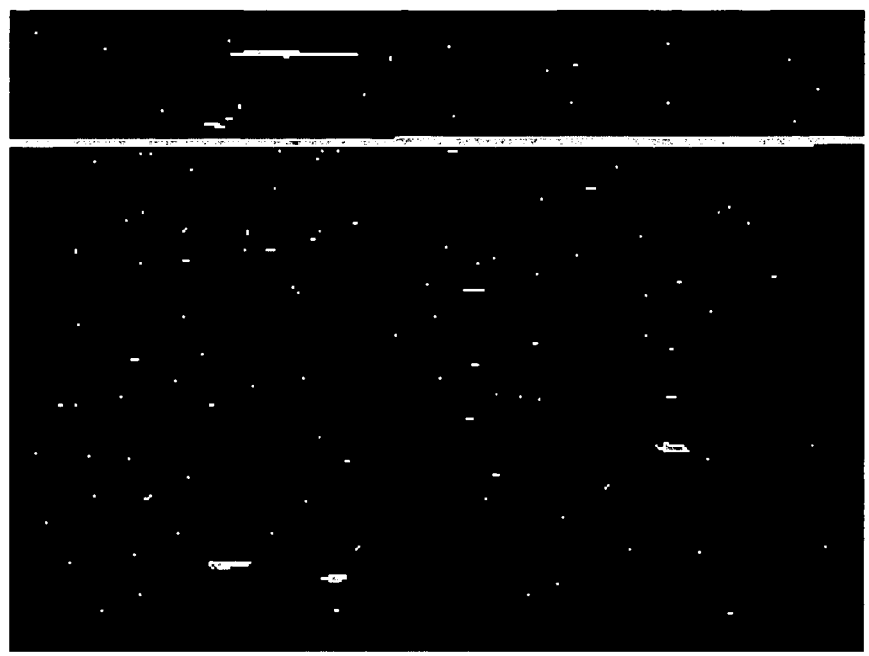
FIG. 4  BER=1%

SYSTEMS AND METHODS FOR VISUALIZING ERRORS IN VIDEO SIGNALS

CROSS-REFERENCE TO RELATED APPLICATIONS

The present application is a continuation application of U.S. patent application Ser. No. 11/366,615, filed on Mar. 3, 2006, entitled "SYSTEMS AND METHODS FOR VISUALIZING ERRORS IN VIDEO SIGNALS", the entirety of which is incorporated herein by reference for all purposes.

BACKGROUND

1. Filed of the Invention

The present invention relates to telecommunications testing. More particularly, the present invention relates to systems and methods for visualizing bit errors occurring in telecommunication access networks.

1. Background

Today's widespread growth in deployment of higher speed DSL service, such as ADSL2/2+, enables telecom service providers to offer voice, video and data over a single twisted pair of copper wires. This is often termed the "triple play" of the telecommunications industry, and more particularly of the digital telecommunications industry.

For the successful adoption of triple play services, telecom providers must meet or exceed the quality of service expected by customers. Quality of service can be impacted by many technical problems. One common problem is the existence of faults in the copper pair that create faults in the ADSL signal, which lead to lost packets and transmission delays. These lost packets and delays create slow data rates and degrade the quality of voice and video service.

The same concerns are also applicable to other telecom services, beyond ADSL service, including ISDN service, and even service provided over fiber optic cable.

No matter what the physical network is composed of, telecom service providers must routinely test and qualify their networks to ensure the quality of service that customers demand in the marketplace.

When analyzing a digital network, one common performance metric is the measurement of bit error rate (BER). This metric is often measured by devices known as bit error rate testers (BERTs), which are designed specifically to test digital networks, systems and subsystems. Generally speaking, the rate of bits incorrectly conveyed over a network is a measure of the bit error rate (BER) of that network, and is an indication of the performance and operability of the network. Typically, some sort of predetermined test pattern that is broken up into a stream of IP packets is sent through the network and a suitable BERT compares the received pattern with a stored version of the test pattern. The BERT itself may also be capable of generating the test pattern, sending the test pattern out over the network, and receiving back the stream of data that it has sent out.

One well-known BERT is the HST-3000 available from JDS Uniphase (San Jose, Calif.). This device is a handheld, modular platform for copper and multi-service testing. The device includes an LCD display that is operable to display various menus and network performance data. As part of its functionality, the HST-3000 includes set-top-box (STB) emulation that enables the HST-3000 to establish program streams in a terminate mode not requiring customer premises equipment (CPE). Quality of Service (QoS) parameter measurement along with detailed troubleshooting analysis features make the HST-3000 a particularly advanced video tool.

Despite the availability of BERTs generally, and the relatively advanced HST-3000 in particular, there is nevertheless a need to further improve upon digital network analysis tools.

For example, testing video services delivered over various access network technologies (DSL, FTTx, etc.) present a complex environment to a field technician. While it is possible to analyze the quality of a video transport stream by analyzing its corresponding digital data, there can be no subjective evaluation without decoding the "picture" for human evaluation. However, a decode process for a full motion video program on a portable field test tool would be very expensive and difficult to accomplish, especially on a typical small screen graphical user interface (GUI) display employed on a device like the HST-3000. Furthermore, "hide" algorithms in a typical video decoder hide various error conditions such as lost video data that would result in lost pixels on the television (monitor) screen.

Thus, there is a need for an improved portable digital video tester that can not only provide objective analysis of a video stream, but can also provide a means for enabling a subjective analysis of the video.

SUMMARY OF THE INVENTION

The present invention provides, among other things, a subjective analysis of the BER of a given bit stream and is particularly suitable for a battery operated test tool, analyzer or bit error rate tester (BERT). Rather than decoding the full picture, which, in any event, would not necessarily reveal problematic video since conventional decoding schemes are specifically designed to hide impairments, the present invention may be configured to gain test access ahead of or before the decoder stage, and thus is able to analyze the raw data flow such that errors are more easily detected.

More specifically, embodiments of the present invention display on a test tool's graphical user interface (GUI) display only corrupted pixels from a video stream flow. In addition, the present invention is preferably able to capture these images from the screen and save them as a computer image file (e.g., JPEG, BITMAP, GIF, etc.) to a file system for later examination by the technician. Consequently, .one can very quickly, almost at a glance, "see" the errors showing up in the stream flow. Since test access is gained before any "hiding" of errors is accomplished by a decoder, a true analysis of video errors can be made. The mechanism or methodology includes analyzing video streams in one or both of two ways outlined below and obtaining data to be presented on the display of the tester from either of the methodologies.

In a first implementation, compression schemes, such as MPEG-2 or MPEG-4 or other compression schemes such as VC-1, are decoded and analyzed. Corrupted pixels are identified and then only those corrupted pixels are presented on the display of the BERT for visual analysis. By only showing corrupted pixels, the user can quickly determine the quality of the signal as opposed to a post decoded video stream which would at worst, show a full motion video with some pixels missing, and at best, show a corrected video stream, thus hiding the error.

In a second implementation, a test file stored in the BERT is used as a reference and compared to the same test file sent over the network, and received for analysis by the test tool or BERT. In this case, the received data is compared to the stored data. Corrupted pixels are identified and only the corrupted data presented on the display. The test file may be sent periodically over the network, or requested by the field technician on demand.

In both cases, the decode function is preferably operated with the decode "hide" algorithms turned off to show raw transport stream errors. With the hide algorithms turned off, raw network performance can be seen and analyzed.

Further, using a color display, a temporal component can be added to the analysis by color coding the errors to show history in time blocks using different colors for each time block, as well as providing histogram presentations of the data. On a gray scale display, the same effect can be achieved for the error data. In addition, a simple quality error score (e.g., on a scale of 1 to 5) can be calculated from the error data to enable a subjective analysis to be scored in an objective manner. The scoring parameters may be calculated in accordance with any well-known technique.

These and other features of the present invention will be more fully illustrated upon a reading of the following detailed description in conjunction with the associated drawings in which:

BRIEF DESCRIPTION OF THE DRAWINGS

FIGS. 2-4 depict exemplary screen displays corresponding to varying levels of detected bit error rate.

DETAILED DESCRIPTION

The present invention allows a field technician, using a portable, battery operated field tester to subjectively assess the BER of a given bit stream. Because decoding and displaying an entire picture or video stream consumes significant amounts of power, the present invention is preferably configured to gain test access ahead of or before the decoder stage, and is thus able to analyze the raw data flow such that errors are more easily detected.

Figure 1:
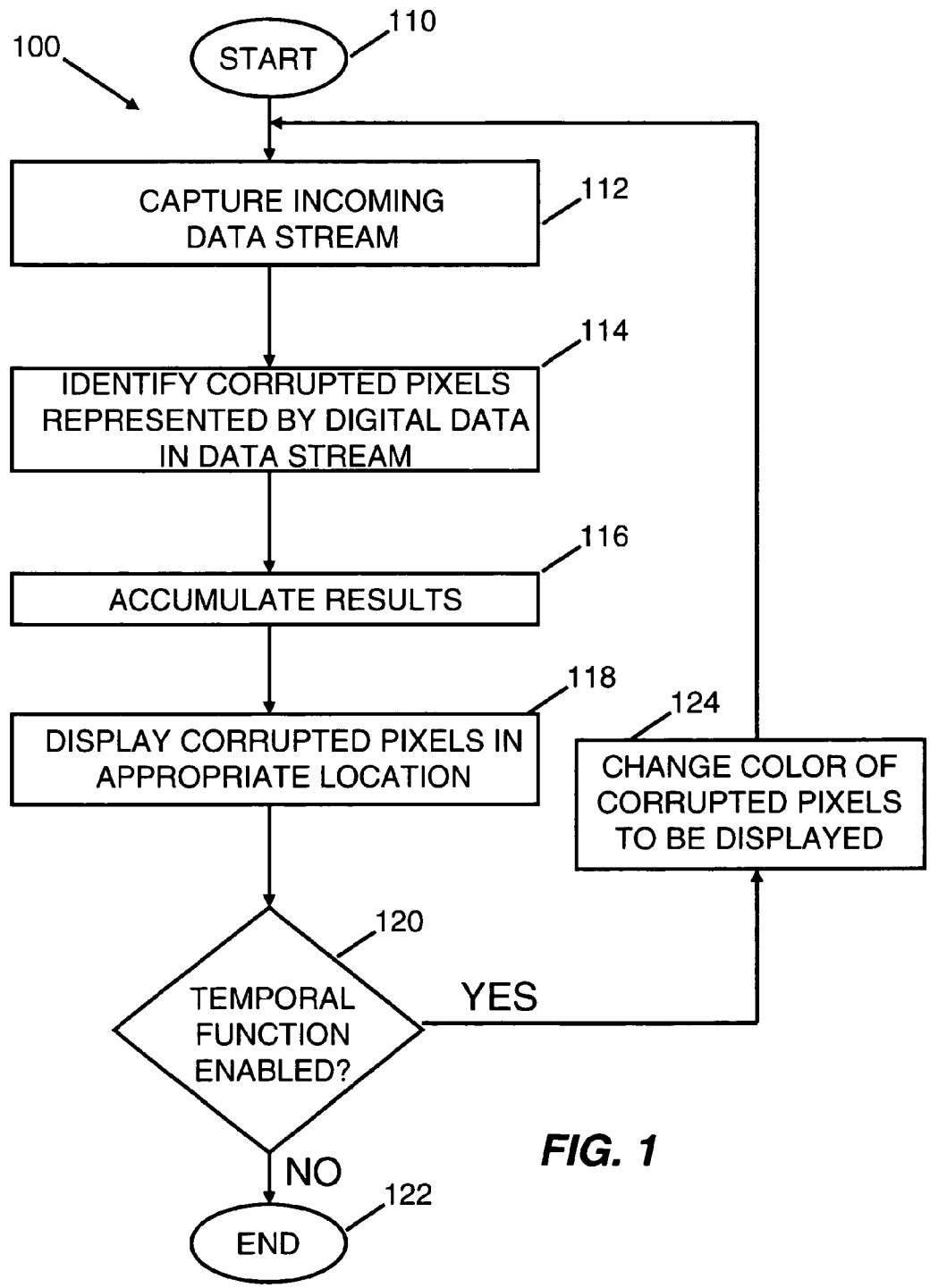
FIG. 1 illustrates an exemplary process for analyzing corrupted pixels in accordance with an embodiment of the present invention.

FIG. 1 shows an exemplary series of steps 100 for achieving the functionality of the present invention. As shown, the process begins at step 110, and immediately moves to step 112 where an incoming data stream is captured. It is well-known in the art how to connect a bit error rate tester (BERT) or other field test device, such as the JDS Uniphase's HST-3000, to a network. The data stream is preferably a video stream that is delivered over xDSL, FTTx (e.g., fiber to the "X", such as home) or ISDN, among others. The video format may be in accordance with an MPEG-2, MPEG-4 or VC-1 format, among others. "Capturing" in accordance with the present invention includes any one or a combination of the following functions: storing, buffering, or creating image files (e.g., JPEGs) as the test is running, so the user can view the results at a later time.

Once the data stream is captured, corrupted packets, data, and, in particular when dealing with video, corrupted pixels are identified at step 114. There are several ways of identifying such packets, data or pixels. For instance, if insufficient information is available to complete a pixel, that pixel could be declared or identified as being corrupted. Since the invention is not CODEC specific, missing data can appear in several manners. Sometimes packets arrive out of order, are missing, or are late and thus unusable. CRC checks, checksums, and Framing bits may be present in a particular video compression algorithm, and may be used to identify data that is corrupt or unusable when the instant the invention receives the data.

In a preferred embodiment, metrics regarding the corrupted data are accumulated at step 116 and numerical statistics can then be calculated and displayed. Algorithms for such calculations are well-known to those having skill in the art.

At step 118 and substantially simultaneously with step 116, only the identified corrupted pixels are presented on the display (e.g., an LCD display) of the BERT. The "corrupted" pixels are preferably displayed in a predetermined color in the location at which they would normally be displayed. In other words, as shown in FIGS. 2-4, the display of the BERT will include a "picture" of only the corrupted pixels. In this way it is relatively simple for a field technician to glance at the display and "see" subjectively, how bad (or good) a bit error rate is at a given time. The display essentially highlights only the locations of pixels that are deemed corrupted.

FIG. 2 shows a display that shows a BER of about 0.1%. It can be seen that the display includes relatively few places having lit-up corrupted pixels. FIG. 3 shows a BER of about 0.3%. More corrupted pixels are shown. FIG. 4 shows a display representing a BER of about 1% and the number of corrupted pixels is readily apparent.

Returning again to FIG. 1, after displaying the corrupted pixels on the display, it is determined whether a temporal function is enabled. If not, the process 100 simply ends at step 122. If the temporal function is enabled, then at step 124 the BERT is configured, for the next display of corrupted pixels, to change the display color of the corrupted pixels that will be presented. In this way, it is relatively simple to compare on a time-based basis, how a BER might be changing.

From the foregoing, those skilled in the art will appreciate that based on a quick view of the display screen of a BERT, one can "see" the number of errors showing up in a given stream of video data. Significantly, since test access is gained before any "hiding" of errors is accomplished by a decoder, a true analysis of video errors can be made. The present invention can be implemented in at least two ways.

In a first implementation, compression schemes, such as MPEG-2 or MPEG-4 or other compression schemes such as VC-1, are decoded and analyzed. Corrupted pixels are identified and then only those corrupted pixels are presented on the display of the BERT for visual analysis. In this case, the field technician might not be able to tell what kinds of pixels might be more susceptible to corruption since the technician might not necessarily know what the streamed picture is supposed to look like in the first place. Nevertheless, this implementation is useful as it provides a real-world view of the network being analyzed.

In a second implementation, a test file stored in the BERT is used as a reference and compared to the same test file sent over the network, and received for analysis by the test tool or BERT. In this case, the received data is compared to the stored data. Corrupted pixels are identified and only the corrupted data presented on the display. The test file may be sent periodically over the network, or requested by the field technician on demand. In this case, the technician, perhaps already being familiar with what the test pattern normally looks like, can more quickly identify types of pixels that are tending to be more susceptible to corruption.

Also, as mentioned above, if a color or gray scale display is available, a temporal component can be added to the analysis whereby color coding the errors can be performed to show history in time blocks using different colors for each time block. In addition, histogram and like views can be generated and displayed for the user by relying on, for example, results accumulated at step 116.

Furthermore, a simple quality error score (e.g., 1 to 5) can be calculated from the accumulated error data to enable a subjective analysis to be scored in an objective manner. The scoring parameters may be calculated in accordance with any well-known technique.

Figure 5:
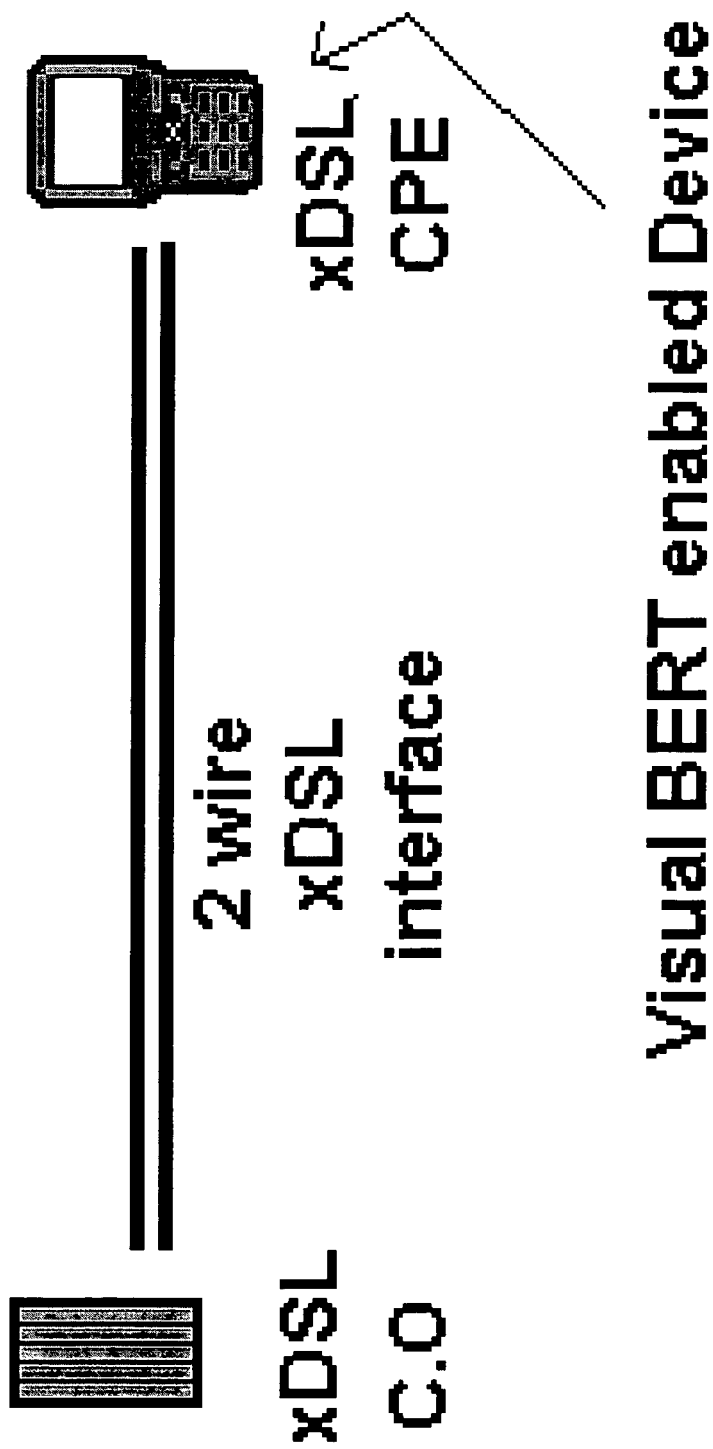
FIGS. 5-7 show test access points in different network types for a BERT in accordance with the present invention.
Figure 6:
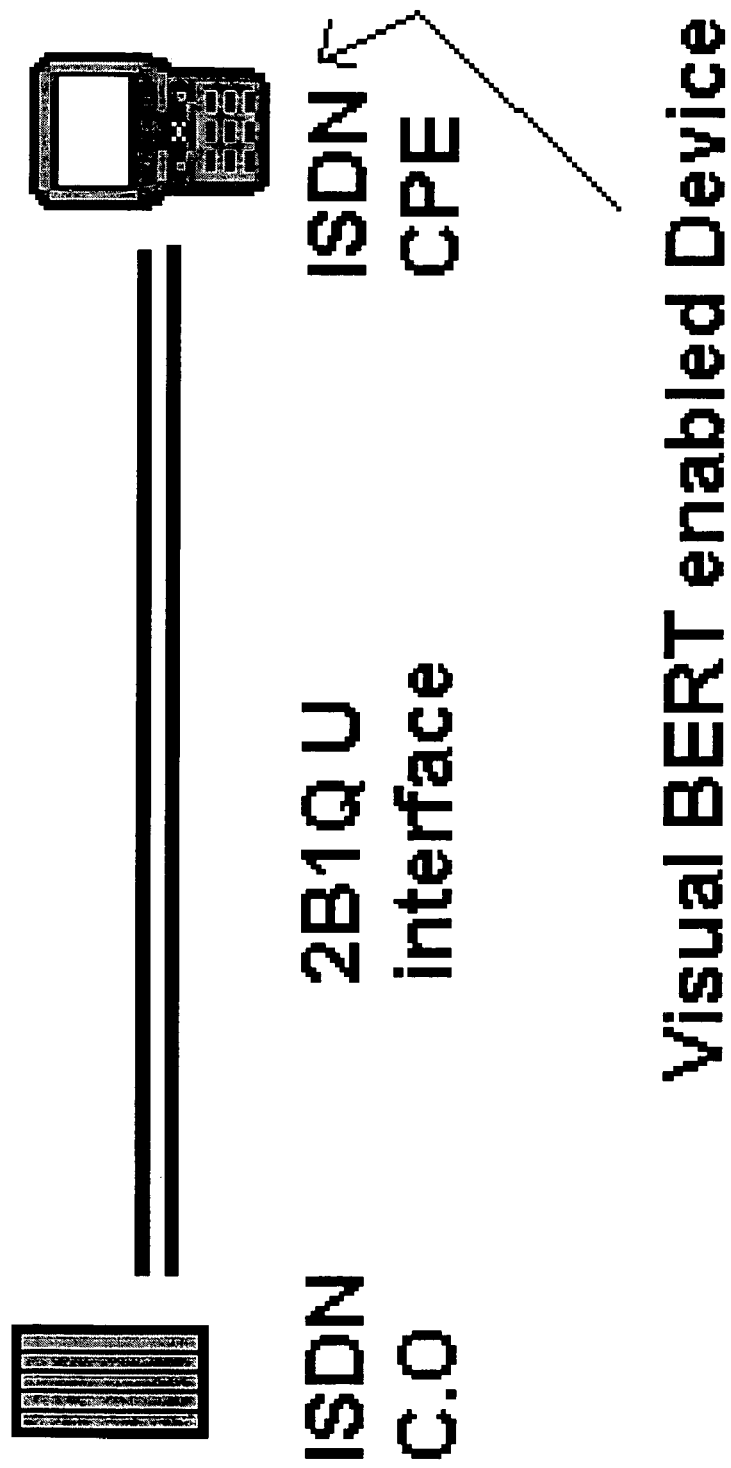
Figure 7:
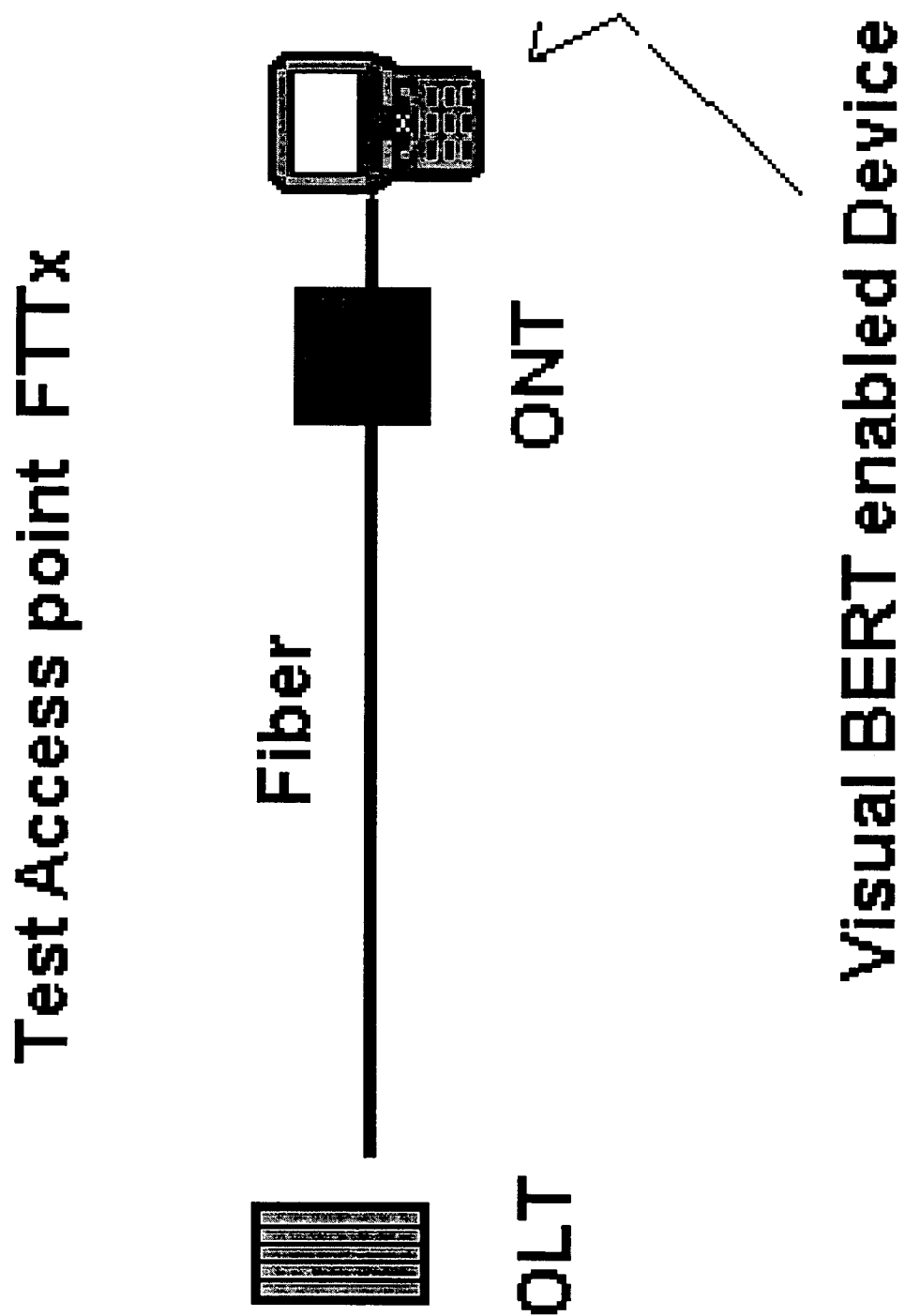

FIGS. 5-7 show test access points for a device operating in accordance with the principles of the present invention for performing bit error testing. FIG. 5 shows an xDSL implementation, FIG. 6 shows an ISDN implementation, and FIG. 7 shows an FTTx implementation (in FIG. 7 OLT is an Optical Line Terminator, and ONT is an Optical Network Terminal. As shown, the BERT is connected to the given network downstream of a headend, central office, or similar data stream source.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for analyzing a data stream representing video, the method comprising:
    capturing a transmitted data stream, being transmitted on a network, the data stream containing data representing streaming video;
    analyzing the captured data stream, in an analysis step, prior to a decoding step in which the data stream is decoded for display as video;
    identifying corrupted pixels in the analysis step, represented by digital data in the data stream; and
    illuminating on a display only the corrupted pixels, so that the corrupted pixels are readily apparent and identifiable as corrupted pixels, at locations on the display at which respective corrupted pixels would otherwise be located;
    wherein the step of identifying comprises at least one of:
    partially decoding the streaming video, or comparing the streaming video to a locally stored predetermined test pattern.

2. The method of claim 1, further comprising accumulating data regarding the corrupted pixels.

3. The method of claim 1, further comprising determining whether a temporal display function is enabled.

4. The method of claim 1, wherein the method is performed by a portable bit error rate tester (BERT).

5. The method of claim 4, wherein the BERT identifies corrupted pixels by decoding the data stream.

6. The method of claim 1, wherein the data stream is transmitted via at least one of Digital Subscriber line (xDSL), Integrated Services Digital Network (ISDN) and Fiber to the X (FTTx).

7. The method of claim 1, further comprising calculating a quality score of the data stream.

8. The method of claim 1, further comprising the decoding step in which the data stream is decoded for display as video.

9. The method of claim 1, further comprising capturing an image of the display wherein only the corrupted pixels are illuminated and saving said image to a file system.

10. A method for analyzing a data stream representing video, the method comprising:
    capturing a transmitted data stream, being transmitted on a network, the data stream containing data representing video;
    analyzing the captured data stream, in an analysis step, prior to a decoding step in which the data stream is decoded for display as video;
    identifying corrupted pixels in the analysis step, represented by digital data in the data stream; and
    illuminating on a display only the corrupted pixels, so that the corrupted pixels are readily apparent and identifiable as corrupted pixels, at locations on the display at which respective corrupted pixels would otherwise be located,
    wherein the method is performed by a portable bit error rate tester (BERT), and wherein the BERT stores a predetermined test pattern, the method comprising comparing the captured data stream with the predetermined test pattern to identify the corrupt pixels.

11. A method of analyzing a performance of a digital network, the method comprising:
    capturing a stream of internet protocol (IP) packets that represent streaming video;
    identifying which of the IP packets include bit errors;
    determining to which of a plurality of pixels the IP packets including bit errors belong and identifying such pixels as corrupted pixels; and
    illuminating only the corrupted pixels on a display so that the corrupted pixels are readily apparent and identifiable as corrupted pixels;
    wherein the step of determining comprises one of: at least partially decoding the streaming video, or comparing the streaming video to a locally stored predetermined test pattern.

12. The method of claim 11, wherein the digital network comprises a Digital Subscriber line (xDSL) network.

13. The method of claim 11, wherein the digital network comprises and an Integrated Services Digital Network (ISDN) network.

14. The method of claim 11, wherein the method is performed by a portable bit error rate tester (BERT).

15. The method of claim 11, further comprising calculating a quality score of the streaming video.

16. A portable, battery operated bit error rate tester, comprising:
    a display;
    means for capturing a stream of internet protocol (IP) packets that represent streaming video;
    means for identifying which of the IP packets include bit errors;
    means for determining to which of a plurality of pixels the IP packets including bit errors belong and identifying such pixels as corrupted pixels by performing a step selected from the group comprising: at least partially decoding the streaming video, and comparing the streaming video to a locally stored predetermined test pattern; and means for illuminating only the corrupted pixels on the display.

* * * * *